(12) United States Patent
Fahlstrom

(10) Patent No.: US 12,090,584 B2
(45) Date of Patent: Sep. 17, 2024

(54) WELDING HEAD AND WELDING HEAD ASSEMBLY FOR AN ARC-WELDING SYSTEM

(71) Applicant: ESAB AB, Gothenburg (SE)

(72) Inventor: Kennet Fahlstrom, Laxa (SE)

(73) Assignee: ESAB AB, Gothenburg (SE)

( * ) Notice: Subject to any disclaimer, the term of this patent is extended or adjusted under 35 U.S.C. 154(b) by 977 days.

(21) Appl. No.: 15/867,812

(22) Filed: Jan. 11, 2018

(65) Prior Publication Data

US 2018/0126479 A1    May 10, 2018

Related U.S. Application Data

(63) Continuation of application No. 13/258,023, filed as application No. PCT/EP2009/053875 on Apr. 1, 2009, now Pat. No. 9,937,581.

(51) Int. Cl.
*B23K 9/18* (2006.01)
*B23K 9/12* (2006.01)

(52) U.S. Cl.
CPC .............. *B23K 9/188* (2013.01); *B23K 9/122* (2013.01)

(58) Field of Classification Search
CPC .......... B23K 9/18; B23K 9/182; B23K 9/186; B23K 9/188; B23K 9/122; B23K 9/125; B23K 9/123; B23K 9/1336; B23K 9/164
See application file for complete search history.

(56) References Cited

U.S. PATENT DOCUMENTS

| | | | |
|---|---|---|---|
| 2,436,387 A | | 2/1948 | Isaac et al. |
| 2,681,970 A | * | 6/1954 | Koopman .............. B23K 9/173 |
| | | | 219/137.2 |
| 3,328,556 A | * | 6/1967 | Nelson ..................... B23K 9/30 |
| | | | 219/137 R |
| 3,519,789 A | * | 7/1970 | Nelson ................. B23K 26/211 |
| | | | 219/137.8 |
| 3,575,569 A | | 4/1971 | Mitchell et al. |

(Continued)

FOREIGN PATENT DOCUMENTS

| CN | 1894070 A | 1/2007 |
|---|---|---|
| CN | 101058126 A | 10/2007 |

(Continued)

OTHER PUBLICATIONS

Australian Office Action for Australian Patent Application 2009343334 dated Aug. 22, 2013.

(Continued)

*Primary Examiner* — Hung D Nguyen
(74) *Attorney, Agent, or Firm* — Edell, Shapiro & Finnan, LLC

(57) ABSTRACT

The invention relates to an electric arc-welding welding head comprising a contact device and one or more wire feeder units, the contact device encompassing an electrode assembly, the electrode assembly comprising at least two fusible continuously-fed wire electrodes arranged in a contact device. An electrically insulated duct is provided for electric insulation of at least one of the electrodes so that the electrode is electrically insulated from other electrodes in the electrode assembly. The invention also relates to an electric arc-welding contact device and an electric arc-welding welding head assembly.

20 Claims, 9 Drawing Sheets

(56) References Cited

U.S. PATENT DOCUMENTS

| | | | |
|---|---|---|---|
| 3,617,690 A * | 11/1971 | Terai | B23K 9/0213 |
| | | | 219/137 R |
| 3,746,833 A | 7/1973 | Ujiie | |
| 3,751,628 A * | 8/1973 | Scherl | B23K 9/04 |
| | | | 219/137 WM |
| 3,992,565 A | 11/1976 | Gatfield | |
| 4,164,808 A | 8/1979 | Gudmestad et al. | |
| 4,261,231 A | 4/1981 | Bleakley | |
| 4,902,873 A | 2/1990 | Ivannikov | |
| 5,124,527 A * | 6/1992 | Takano | B23K 9/164 |
| | | | 219/137 R |
| 5,155,330 A | 10/1992 | Fratiello et al. | |
| 5,714,735 A | 2/1998 | Offer | |
| 5,914,055 A * | 6/1999 | Roberts | B23K 9/044 |
| | | | 219/137 WM |
| 5,994,659 A * | 11/1999 | Offer | B23K 9/1336 |
| | | | 219/136 |
| 6,172,333 B1 | 1/2001 | Stava | |
| 6,307,177 B1 * | 10/2001 | Herrich | B23K 9/12 |
| | | | 219/130.01 |
| 6,683,279 B1 | 1/2004 | Moerke | |
| 7,495,192 B2 | 2/2009 | Takahashi | |
| 7,525,067 B2 | 4/2009 | Diez | |
| 9,018,563 B2 * | 4/2015 | Yamazaki | B23K 35/38 |
| | | | 219/130.01 |
| 2002/0060211 A1 * | 5/2002 | Marhofer | B23K 9/0286 |
| | | | 219/60 R |
| 2006/0243704 A1 * | 11/2006 | Matz | B23K 9/1735 |
| | | | 219/74 |
| 2007/0145028 A1 * | 6/2007 | Artelsmair | B23K 9/1675 |
| | | | 219/137.71 |
| 2007/0164074 A1 * | 7/2007 | Schorghuber | B23K 9/133 |
| | | | 226/108 |
| 2007/0284351 A1 | 12/2007 | Diez | |
| 2008/0169336 A1 * | 7/2008 | Spiegel | B23K 9/1735 |
| | | | 228/177 |
| 2009/0050609 A1 | 2/2009 | Berger et al. | |
| 2009/0188896 A1 | 7/2009 | Khakhalev | |
| 2009/0274553 A1 * | 11/2009 | Bunting | F01D 25/246 |
| | | | 29/402.07 |
| 2010/0301030 A1 * | 12/2010 | Zhang | B23K 9/1675 |
| | | | 219/130.1 |

FOREIGN PATENT DOCUMENTS

| | | | | |
|---|---|---|---|---|
| GB | 1400051 | | 7/1975 | |
| GB | 1400051 A | * | 7/1975 | B23K 9/188 |
| JP | H07-236974 A | | 9/1995 | |
| JP | 08224667 A | | 9/1996 | |
| JP | H08-224667 A | | 9/1996 | |
| JP | H10-080776 A | | 3/1998 | |
| JP | 10-099969 A | | 4/1998 | |
| JP | 2001-030077 A | | 2/2001 | |
| JP | 2001-129669 A | | 5/2001 | |
| JP | 2003-112261 A | | 4/2003 | |
| JP | 3423467 B2 | | 7/2003 | |
| JP | 2005-507783 A1 | | 3/2005 | |
| JP | 2005-224837 A | | 8/2005 | |
| JP | 2006-519103 A | | 8/2006 | |
| JP | 2007-030019 A | | 2/2007 | |
| JP | 2007-513779 A | | 5/2007 | |
| JP | 2007-326148 A | | 12/2007 | |
| JP | 2008-055506 A | | 3/2008 | |
| JP | 2008-055509 A | | 3/2008 | |
| JP | 2009-506893 A | | 2/2009 | |
| KR | 1993-0009373 B1 | | 10/1993 | |
| WO | WO-0162424 A1 | * | 8/2001 | B23K 9/295 |
| WO | 2007028185 A2 | | 3/2007 | |

OTHER PUBLICATIONS

Australian Office Action for Australian Patent Application 2009343334 dated Dec. 12, 2013.

Australian Office Action for Australian Patent Application 2009343334 dated May 23, 2014.

Brazilian Office Action for Brazil Patent Application PI0924883-8 dated Apr. 1, 2009.

First Chinese Office Action for Chinese Patent Application 200980158562.6 dated Aug. 5, 2013.

Second Chinese Office Action for Chinese Patent Application 200980158562.6 dated Feb. 24, 2014.

Third Chinese Office Action for Chinese Patent Application 200980158562.6 dated Jul. 21, 2014.

Decision on Rejection for Chinese Patent Application 200980158562.6 dated Feb. 28, 2015.

Notification of Reexamination for Chinese Patent Application 200980158562.6 dated Dec. 22, 2015.

Reexamination Decision (No. 107607) for Chinese Patent Application 200980158562.6 dated Mar. 31, 2016.

Japanese Office Action for Japanese Patent Application 2012-502465 dated May 7, 2013.

Japanese Office Action for Japanese Patent Application 2012-502465 dated Mar. 18, 2014.

Korean Office Action for Korean Patent Application 2011-7023156 dated Jan. 8, 2015.

International Search Report from corresponding PCT Application PCT/EP2009/053875.

* cited by examiner

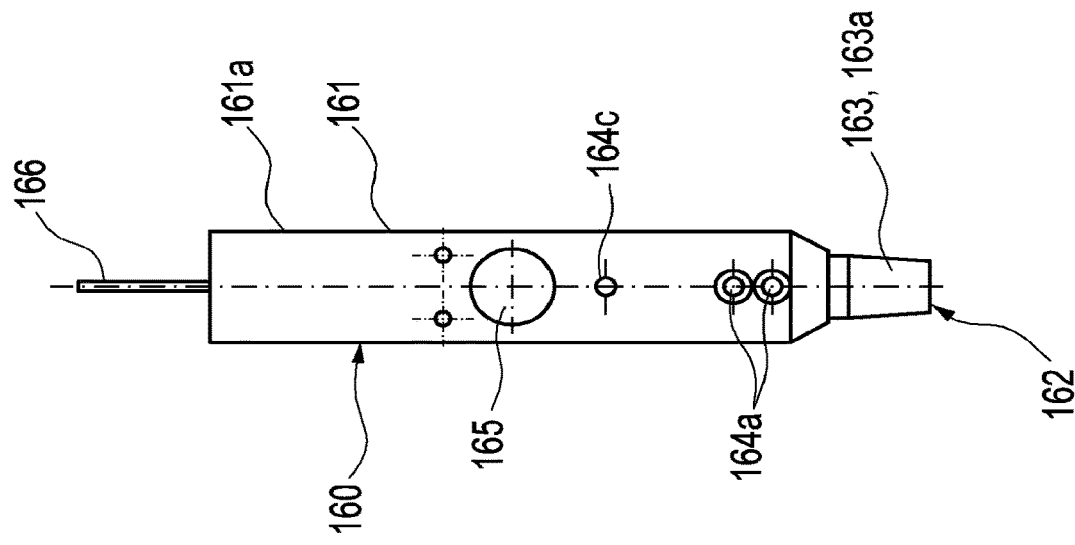
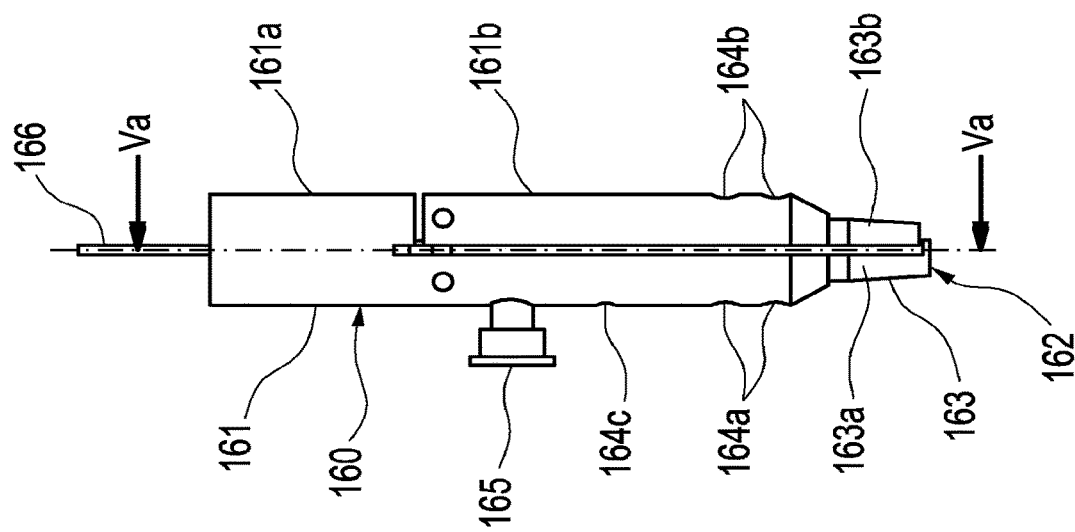
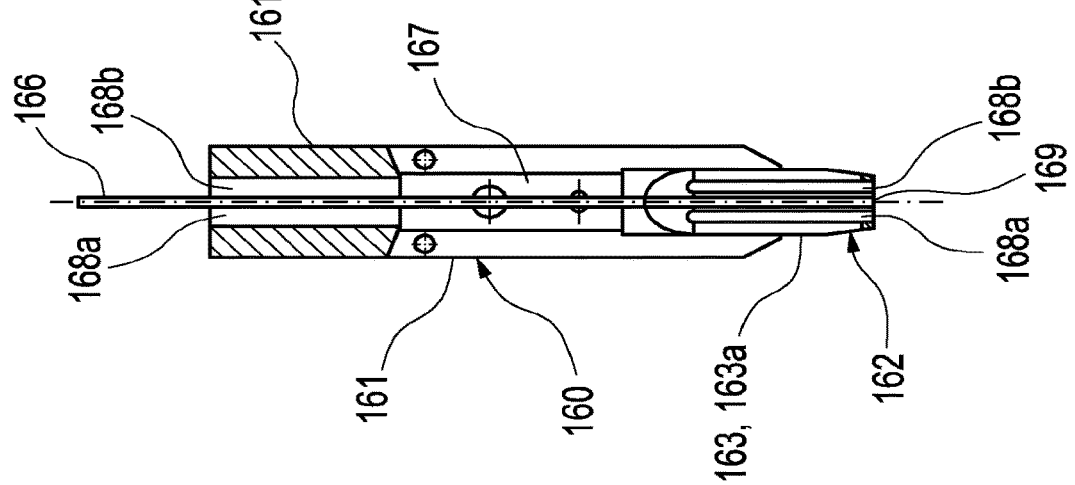

WELDING HEAD AND WELDING HEAD ASSEMBLY FOR AN ARC-WELDING SYSTEM

CROSS-REFERENCE TO RELATED APPLICATIONS

This application is a continuation of U.S. non-provisional application Ser. No. 13/258,023 filed on Dec. 9, 2011, entitled "Welding Head And Welding Head Assembly for an Arc-Welding System," which is a national phase application, under 35 U.S.C. § 371, based on and claiming the benefit of international patent application no. PCT/EP2009/053875, which has an international filing date of Apr. 1, 2009. The disclosures of the above applications are each incorporated herein by reference in their entirety.

TECHNICAL FIELD

The invention relates to a welding head for an arc-welding system and a welding head assembly for an arc welding system, particularly for submerged arc welding comprising an electrode assembly with a multitude of electrodes.

BACKGROUND OF THE INVENTION

Submerged arc welding is a fully mechanized welding method characterized by high productivity and quality, often used for longer welding seems in thicker materials. During submerged arc welding one or more sequentially arranged welding electrodes melt in arcs.

The weld, particularly the melted material and the arc, are protected beneath a layer of pulverized flux. The flux melts in part during the process, thus creating a protecting layer of slag on the weld pool. The electrical current used in the process is relatively high, usually within 300-1500 Ampere per electrode. The electrodes used in submerged arc welding are usually 2.5-6 mm in diameter.

Fluxes used in submerged arc welding are granular fusible minerals typically containing oxides of manganese, silicon, titanium, aluminum, calcium, zirconium, magnesium and other compounds such as calcium fluoride. The flux is specially formulated to be compatible with a given electrode wire type so that the combination of flux and wire yields desired mechanical properties. All fluxes react with the weld pool to produce the weld metal chemical composition and mechanical properties. It is common practice to refer to fluxes as 'active' if they add manganese and silicon to the weld, the amount of manganese and silicon added is influenced by the arc voltage and the welding current level.

To find the highest productivity possible with submerged arc welding, with increased competitiveness as one result, one strives for increased weld speed and the highest possible deposition rate, i.e. melted welding consumables, or really created joint material, per hour and electrode.

One solution to this known in the art is to use multiple electrodes, positioned sequentially in the direction of the weld seem. Usually 2-3 electrodes are used, however, usage of up to 6 electrodes is known.

It is known that addition of metal which melts without an arc can improve the deposition rate during welding. For instance, metal powder or metal wires can be added during arc welding.

GB 1400051 A discloses an arrangement to improve the deposition rate during submerged arc welding of a workpiece 10. The general principle is illustrated in FIG. 1. Three continuously fed wire electrodes 30, 36, 40 serially disposed along a weld seam are consumed in arcs while moving in a welding direction 20. The electrodes 30, 36, 40 are also known as "hot" or "hot wire" electrodes. Two additional electrodes 32, 38 consumed without forming arcs are continuously fed into the molten weld pool 12 in the region of the arc of the middle electrode 36. These additional electrodes 32, 38, also known as "cold wires" or "cold wire electrodes" are in continuous short-circuit contact with the weld pool 12. The two electrodes 32, 38 consumed in the molten weld pool 12 without the formation of arcs are melted by resistance heating as well as by the heat generated by the middle electrode 36. The process uses a flux to generate protective gases and slag, and to add alloying elements to the weld pool 12. An additional shielding gas is not required. Prior to welding, a thin layer of flux powder is placed on the workpiece surface. The arc moves along a joint line in welding direction 20 and as it does so, flux is fed to the welding area by a flux feed hopper. As the arc is completely covered by the flux layer, heat loss is extremely low. This produces a thermal efficiency as high as 60%, compared with 25% for manual metal arc. There is no visible arc light, welding is virtually spatter-free and there is no need for fume extraction.

Even though the above mentioned solutions increase the deposition rate during welding it is desirable to provide a better handling of such cold electrodes.

SUMMARY OF THE INVENTION

It is an object of the invention to provide an electrode assembly which allows for improved welding speed. Another object of the invention is to provide a method with an improved welding speed in conjunction with a satisfying weld quality. Another object is to provide an apparatus for performing such method.

The objects are achieved by the features of the independent claims. The other claims and the description disclose advantageous embodiments of the invention.

According to a first aspect of the invention, an electric arc-welding welding head is proposed comprising a contact device and a feeding portion, the contact device encompassing an electrode assembly, the electrode assembly comprising at least two fusible continuously-fed wire electrodes arranged in a contact device. An electrically insulated duct is provided for electric insulation of at least one of the electrodes so that the electrode is electrically insulated from other electrodes in the electrode assembly in the contact device.

The electrically insulating duct comprises insulated portions in wire feeder and wire straightening units as well as guiding tubes outside the feeder and straightening units. The duct can be composed of a multitude of electrically insulating sections along the electrically insulated electrode from a wire reservoir such as a wire bobbin to the contact device close to the workpiece to be welded. Preferably, the electric arc-welding head is employed for submerged arc welding. Submerged arc welding can be operated as a fully-mechanized or automatic process, optionally it can be semi-automatic. Typical welding parameters are current, arc voltage and travel speed which all can affect bead shape, depth of penetration and chemical composition of the deposited weld metal from the electrodes.

Favorably, the welding head is compact and allows for an independent manipulation of the at least one electrically insulated electrode compared to the other electrodes in the electrode assembly of the welding head. The electrodes can be supplied by rear mounted wire bobbins on a so called "column and boom" arrangement. A column and boom is a rail moving manipulator which carries the welding head. The column and boom is used to position the welding head to the weld groove. The column and boom could also be designed to carry the welding equipment such as power sources, flux handling equipment and electrode coils as known in the art of arc-welding systems. Preferably, the electrically insulated electrode is a "cold wire" electrode which can be fed through a spring-loaded contact-device inside a ceramic tube. The one or more hot wire electrode and the cold wire electrode can have separate wire feeders, making this a non-synergetic set-up, offering a much wider weld parameter window compared to a synergetic set-up.

Using a cold wire electrode in combination with a one or more hot wire electrodes offers the possibility to deposit about the same volume as with three hot wire electrodes with the additional benefit of a reduced heat generation, as the cold wire electrode only "melts" down into the weld pool and thus lowers the temperature. This in turn allows for a different heat impact on the weld workpiece which in many cases is highly beneficial and opens up for higher productivity. The increase in deposition rate can be above 20%, with a prospect to an increase of productivity of almost 50% with optimized welding parameters. The invention allows for higher deposition rates without increasing the welding speed. Expediently, the invention allows for retrofitting existing welding systems, particularly for welding of large workpieces such as pipe-mills.

According to a favorable embodiment of the invention, the electrically insulated duct can comprise an electrically insulated wire conduit in the contact device. The insulated wire conduit can be a ceramics tube arranged in the contact device. The ceramics tube can be inserted in the contact device or a part of the contact device can be treated, e.g. oxidized, to form an oxide of sufficient thickness for electrical insulation.

According to a favorable embodiment of the invention, the electrically insulated duct can comprise an electrically insulated portion in a wire straightening unit for straightening one or more of the electrodes. The hot and cold electrodes can be manipulated in the same wire straightening device.

According to a favorable embodiment of the invention, an individual wire straightening unit can be provided for the electrically insulated electrode separate from wire straightening units of other electrodes of the electrode assembly. Advantageously, the electrically insulated electrode can be manipulated independently from other, particularly hot wire electrodes.

According to a favorable embodiment of the invention, the electrically insulated duct can comprise an electrically insulated portion in a wire feeder unit for feeding one or more electrodes towards a workpiece. The hot and cold electrodes can be manipulated in the same wire feeder device.

According to a favorable embodiment of the invention, an individual wire feeder unit can be provided for the electrically insulated electrode separate from wire feeding units of other electrodes of the electrode assembly. Advantageously, the electrically insulated electrode can be manipulated independently from other, particularly hot wire electrodes.

According to a favorable embodiment of the invention, an individual speed control unit can be provided for the electrically insulated electrode separate from speed control unit of other electrodes of the electrode assembly. Advantageously, the electrically insulated electrode can be manipulated independently from other, particularly hot wire, electrodes.

Favorably, the electrically insulated electrode can be fed independently from other electrodes in the contact device. This allows for a comfortable control of the welding process. The electrically insulated electrode, being a cold wire electrode, can be fed with a different speed, particularly with a variable speed and/or with a different diameter, independent from other electrodes in the contact device.

According to a favorable embodiment of the invention, the electrode in the electrically insulated duct can be arranged in sequential order between a leading and a trailing electrode with respect to a welding direction on a workpiece. The order of the electrically insulated electrode can be used to adjust the welding deposition rate. Such a symmetric arrangement can yield very high deposition rates. The sequential order of the electrically insulated electrode can be chosen depending on welding requirements.

According to a favorable embodiment of the invention, the electrode in the electrically insulated duct can be arranged upstream of the other electrodes of the electrode assembly with respect to a welding direction on a workpiece. Depending on welding requirements the sequential order of the electrically insulated electrode can be chosen. A benefit of an asymmetric arrangement of the electrodes is that the cold wire can be more easily controlled in case any kind of adjustment of an angle of approach is required. The outermost electrodes can be tilted to a desired angle compared to the other electrodes. An asymmetric arrangement particularly allows adjusting such an angle in a straightforward manner.

According to a favorable embodiment of the invention, the electrode in the electrically insulated duct can be arranged downstream of the other electrodes of the electrode assembly with respect to a welding direction on a workpiece. The sequential order of the electrically insulated electrode can be chosen depending on welding requirements.

According to a favorable embodiment of the invention, a feeder unit and/or a straightening unit for the electrodes, other than the electrically insulated electrode, can provide a feedthrough for guiding the electrically insulated electrode through the feeder unit. Favorably, the electrically insulated electrode can pass in the feedthrough through the wire straightening unit or the wire feeder unit without interacting with these units or the other electrodes. The electrically insulated electrode can be manipulated independently from the other electrodes in the same contact device of the same welding head.

According to another aspect of the invention, a welding head assembly is proposed comprising at least two electric arc-welding welding heads, at least one of which comprises a contact device and a feeding portion, the contact device encompassing an electrode assembly, wherein the electrode assembly comprises at least two fusible continuously-fed wire electrodes arranged in a contact device. An electrically insulated duct is provided for electric insulation of at least one of the electrodes so that the electrode is electrically insulated from other electrodes of the electrode assembly. Favorably, such a welding head assembly is a powerful tool for very high deposition rates with reduced heat impact on workpieces. The welding quality can thus be improved.

According to a favorable embodiment of the invention, a first welding head can be arranged in sequential order before a second welding head so that the electrode assemblies of each welding head are aligned along a welding direction during a welding operation in sequential order. The welding head according to the invention allows for a large degree of freedom when designing such a welding head assembly.

According to a favorable embodiment of the invention, an order of the electrically insulated electrode in each electrode assembly can be the same for each welding head with respect to the other electrodes in each electrode assembly. The welding head according to the invention allows for a large degree of freedom when designing such a welding head assembly.

According to a favorable embodiment of the invention, an order of the electrically insulated electrode in one electrode assembly can be reversed with respect to an order of the electrically insulated electrode in another electrode assembly of the welding head arrangement. The welding head according to the invention allows for a large degree of freedom when designing such a welding head assembly.

According to a favorable embodiment of the invention, each electrically insulated electrode can be provided with a wire straightening unit and/or a wire feeder unit separate from wire straightening units and/or feeder units of the other electrodes of the electrode assemblies. The electrically insulated electrodes can be manipulated independently from the other electrodes and independently in each welding head thus giving a large degree of freedom in adapting welding parameters for particular welding requirements imposed by material and/or geometry and/or ambient conditions of the workpieces to be welded.

According to another aspect of the invention, an electric arc-welding contact device for an electric arc-welding head and/or a welding head assembly is proposed, comprising a device body and an electrically insulated portion for guiding an electrode in an electrically insulated way through the contact device and at least one duct for at least another electrode which is in electrical contact with the device body. Favorably, a compact device is provided where one or more electrically insulated electrodes can be employed together with one or more non-insulated electrodes. The one or more electrically non-insulated electrodes can be provided for being consumed in arcs during welding whereas the one or more electrically insulated electrodes can be so called cold electrodes which are not consumed by arcs but are intended to melt in the weld pool during welding. The electrically insulated wire can be used with various diameters chosen independently from the other electrodes in the contact device.

According to a favorable embodiment of the invention, the electrically insulated portion can comprise an electrically insulating tube. An electrically insulating tube can be easily inserted into the device body. Expediently, the tube can be made of ceramics which provides a superior electrical insulation as well as a good heat resistance.

According to a favorable embodiment of the invention, the device body can be composed of a main part and a removable part which can be attached to the main part. An arrangement of the electrodes in a desired sequential order can be easily achieved or changed.

According to a favorable embodiment of the invention, a tip can provided at one end of the device body which has recesses for receiving the electrically insulating portion for an electrically insulating electrode and ducts for other electrodes. Favorably, the one or more electrodes and the electrically insulating portion can be arranged in the grooves of the tip in a defined way and held securely during operation.

According to a favorable embodiment of the invention, the electrically insulating portion can be arranged in a symmetric position between ducts for other electrodes. Favorably, the electrically insulated portion for guiding an electrode can be arranged between two ducts of electrodes. Such a symmetric arrangement provides a high deposition rate during welding According to a favorable embodiment of the invention, the electrically insulating portion can be arranged in an eccentric position in relation to ducts for other electrodes in the device body. Particularly, the electrically insulating portion can be provided during welding under a desired angle when approaching the weld pool by tilting the contact device.

According to another aspect of the invention, an electric arc-welding system is provided for generating a weld pool in a workpiece, comprising at least one welding head or at least one welding head assembly according to anyone of the features described above. A highly versatile system can be provided which allows for easy adjustment of the welding parameters and conditions.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION

Figure 1:
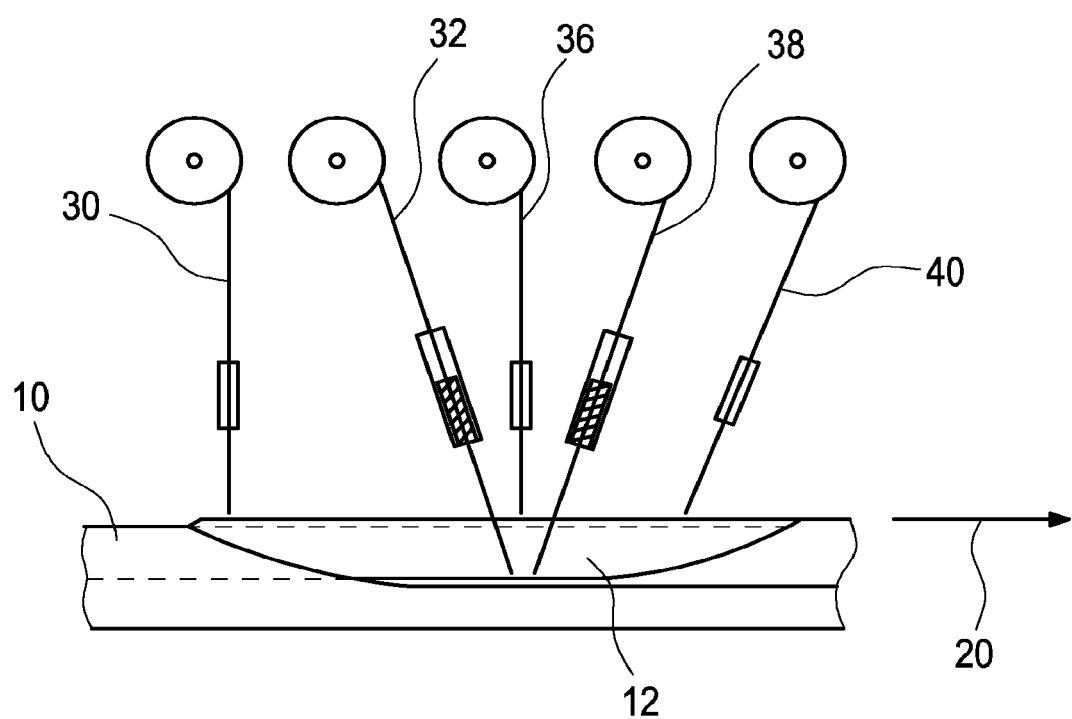
FIG. 1: a welding arrangement with hot and cold electrodes according to the prior art.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
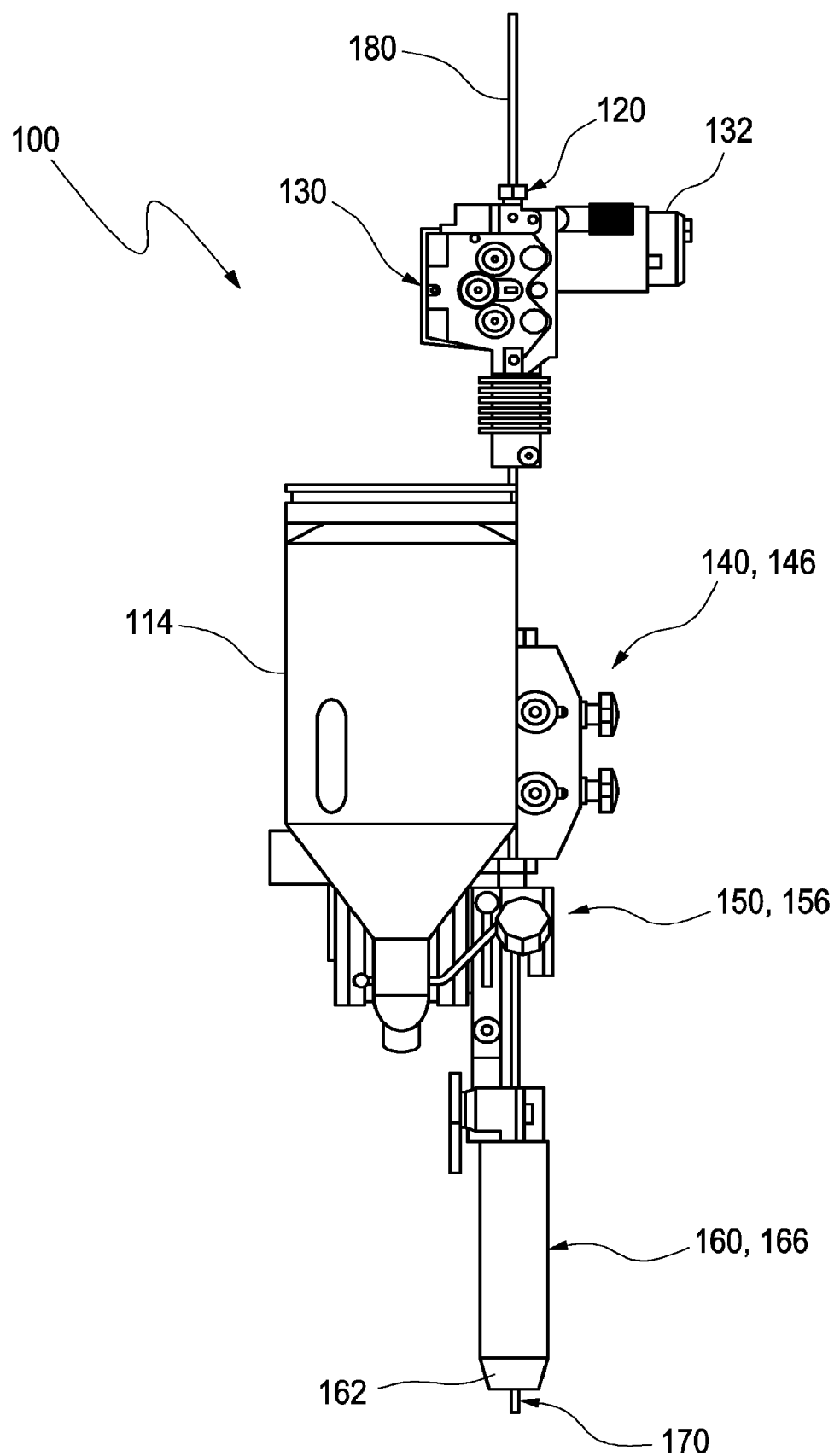
FIG. 2: a first view of an example embodiment of an arc-welding welding head according to the invention for submerged arc welding.
Figure 3:
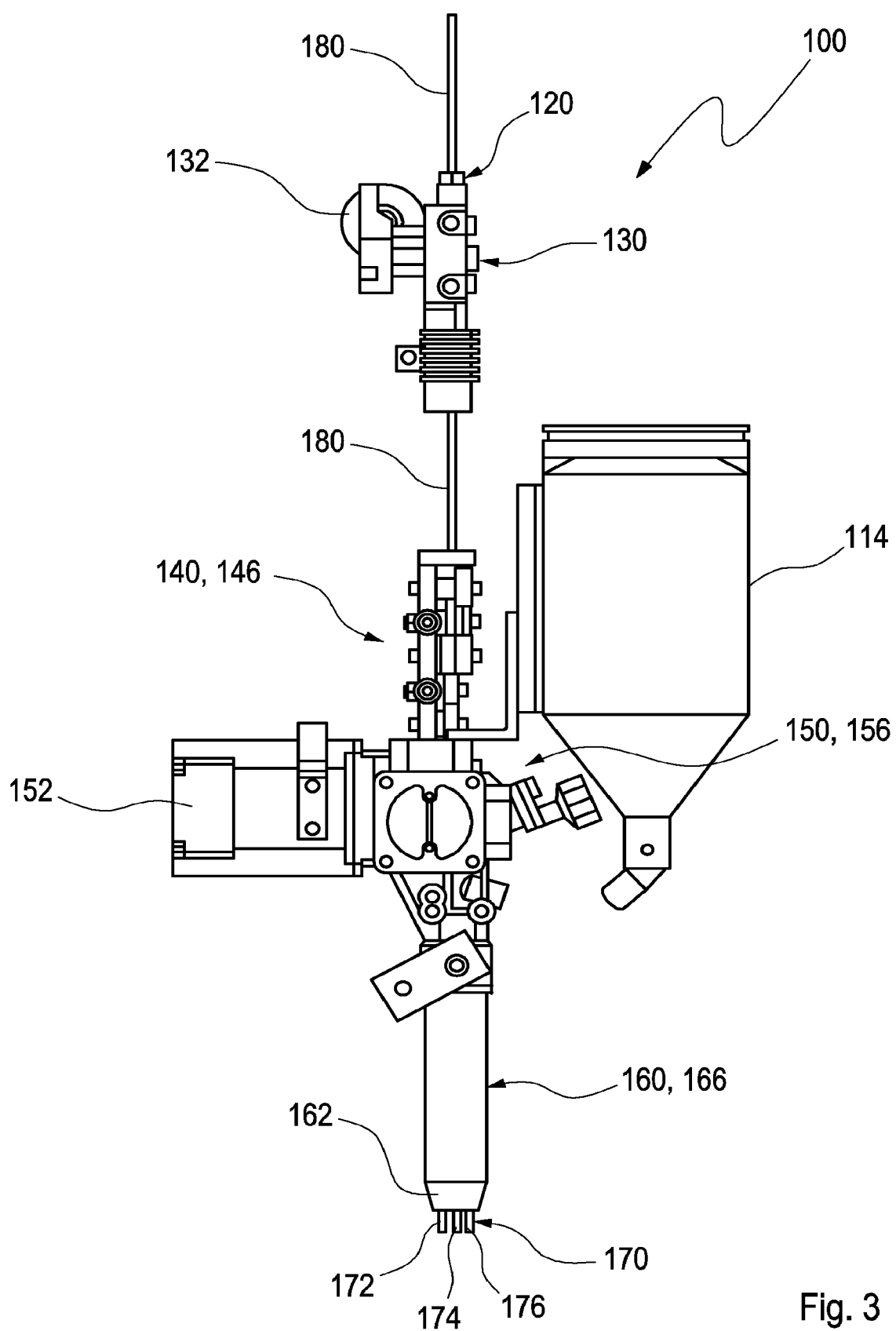
FIG. 3: the arc-welding welding head of FIG. 1 turned counterclockwise by 90°.
Figure 4:
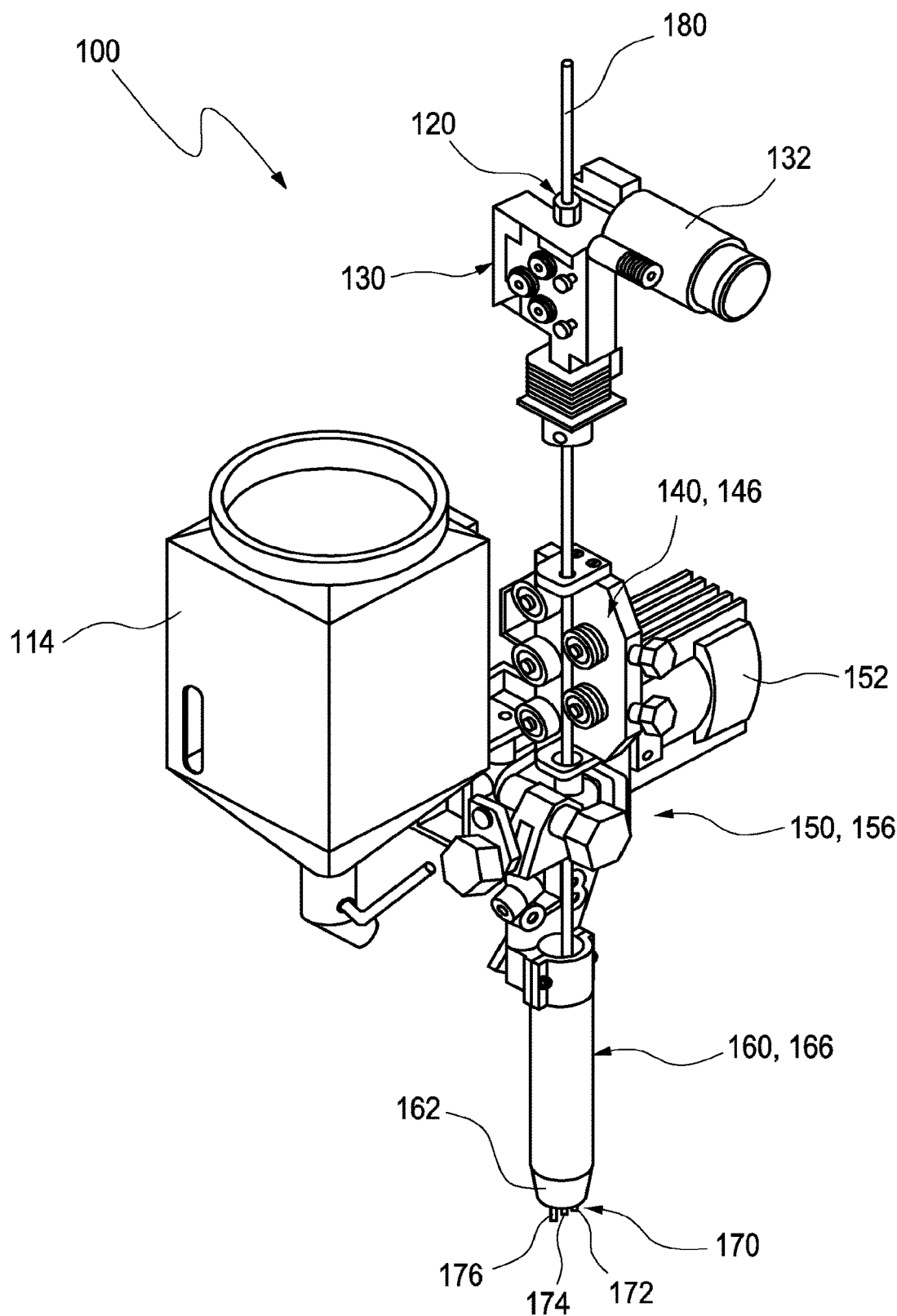
FIG. 4: a perspective view or the arc-welding head of FIG. 1.

FIGS. 2 to 4 depict different views of an example embodiment of an electric arc-welding welding head 100 according to the invention for submerged arc welding which views are described in combination.

Along its longitudinal extension the electric arc-welding welding head 100 comprises a contact device 160 at its lower end which during welding is in close proximity to the workpiece to be welded. The contact device 160 holds the electrodes 172, 174, 176 (FIGS. 3, 4) of the electrode assembly 170 of the welding head 100. The electrodes 172, 174, 176 exit the contact device 160 through an outlet 162 at the lower end of the contact device 160 which faces the workpiece during the welding operation. The wire electrodes 172, 174, 176 may be fed from respective reservoirs such as coils (not shown) towards the arc welding head 100.

The electrode assembly 170 comprises by way of example three fusible continuously-fed wire electrodes 172, 174, 176 arranged in the contact device 160. The contact device 160 comprises an electrically insulating portion 166 for an electrically insulated wire electrode 174. Only the electrically insulated electrode 174 is shown along the welding head extension. The other electrodes 172, 176 are only shown in the contact device 160. The non-insulated electrodes 172, 176 can be arranged as so called twin wires which are fed in parallel as a double wire electrode arrangement. The electrically insulating portion 166 is preferably an extra insulated wire conduit, for instance made of heat resistant material such as ceramics.

Above the contact device 160 a feeder device 150 is arranged which feeds the electrodes towards the contact device 160. Typically, the feeder unit 150 comprises grooved wheels which move the wire electrodes 172, 176 (not shown in this portion for clarity reasons) towards the contact device 160. The feeder unit 150 comprises an electrically insulating portion 156 for feeding through the electrically insulated electrode 174. The electrically insulating portion 156 can consist of feeder wheels with an extra insulated groove for the electrically insulated electrode 174. The electrically insulated electrode 174 can pass through the wire feeder unit 150 freely. The feeder wheels are driven by a driving unit 152, e.g. an electric motor.

Aside from the wire feeder unit 150 a flux hopper 114 is arranged which feeds granular flux to the contact device 160 via a nozzle (not shown) for submerged arc welding. Besides the driving unit 152 the wire feeder unit 150 comprises a gear with a drive shaft. On the drive shaft of the gear a feeding wheel 154 (FIG. 6) is arranged which can be pressurized by another wheel (not shown). The feeding wheel 154 drives the wire electrode forward in the direction of the contact device 160.

Above the wire feeder unit 150 a wire straightening unit 140 is arranged for straightening the wire electrodes 172, 176. Two rollers (not referred to with reference numbers) depicted in a foremost position of the wire straightening unit 140 are used to exert a pressure on three fixed wheels arranged vertically one over the other in the rear part of the wire straightening device. The pressure the rollers are exerting on the wheels is adjustable via knobs at the outside of the wire straightening unit 140. The pressure of the rollers on the three wheels is straightening the wire. The wire straightening unit 140 comprises an electrically insulating portion 146 through which the electrically insulated electrode 174 can pass freely through the wire straightening unit 140.

Above the wire straightening unit 140 a separate wire feeder unit 130 is disposed for feeding the electrically insulated electrode 174 towards the contact device 160. On the wire feeder unit 130 a driving unit 132, e.g. an electric motor, is arranged which drives feeder wheels of the wire feeder unit 130. Besides the driving unit 132, the wire feeder unit 130 comprises a gear with a drive shaft. On the drive shaft of the gear a feeding wheel 134 (FIG. 6) is arranged which can be pressurized by another wheel (not shown). The feeding wheel 134 drives the wire electrode forward in the direction of the contact device 160.

Above the wire feeder unit 130 a separate wire straightening unit 120 is arranged for straightening the electrically insulated electrode 174. Thus, along the longitudinal extension of the welding head 100 an electrically insulating duct 180 is provided for guiding the electrically insulated electrode 174 from a wire reservoir such as a wire bobbin (not shown) to the contact nozzle. Between the feeder units 150 and 130 and above the wire straightening unit 120 an electrically insulated wire conduit can be arranged which receives the electrically insulated electrode 174.

Particularly, the electrically insulating duct 180 consists of the electrically insulating portion 146 of the wire straightening unit 140, the electrically insulating portion 156 of the wire feeder unit 150 for the non-insulated electrodes 172, 176, and the electrically insulating portion 166 of the contact device 160 as well as electrically insulated wire conduits between and the units 130, 140, 150, 160 and above the wire straightening unit 120 for the electrically insulated electrode 174.

FIG. 5a to FIG. 5e depict various views of a contact device 160 which are described in combination. The contact device 160 encompasses a device body 161 which comprises ducts for receiving wire electrodes (not shown), wherein an electrically insulated portion 166 is one of the ducts.

Figure 5:
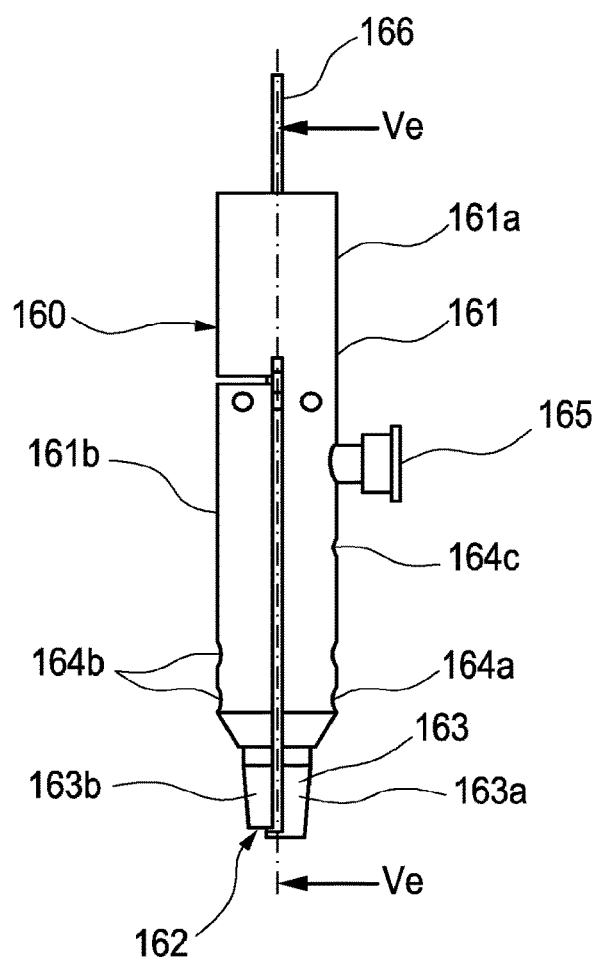
FIG. 5a-5e: various views of a contact device for three wire electrodes with cut open views (FIGS. 5a, 5e) and side views (FIGS. 5b, 5d) and a front view (FIG. 5c)
Figure 5:
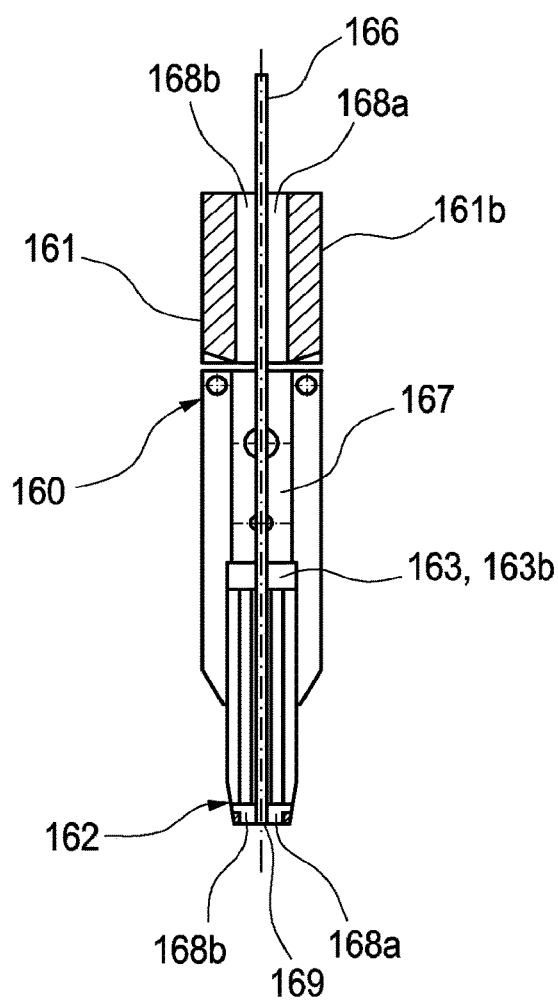

By way of example the device body 161 is made of two parts 161a, 161b separated in longitudinal direction where a removable part 161b is attached to the main part 161a. The main part 161a has a cylindrical upper portion and a lower portion which is slightly recessed in relation to the cut through the middle (FIG. 5a, 5e). The removable part 161b is attached to the recessed portion of the main part 161a by screws.

Alternatively, the device body 161 can be a monolithic metal body with one or more bores drilled through for the passage of the wire electrodes instead of several pieces. Between the removable part 161b and the main part 161a remains a small free distance when the parts 161a and 161b are attached to one another. The distance allows for using various wire diameters for the electrodes in the contact device 160. As the electrically insulated electrode is guided separately in the electrically insulated portion 166 the diameter of the electrically insulated electrode can be chosen independently from the diameters of the other electrodes in the device body 161.

The parts 161a, 161b of the device body 161 enclose a tip 163 which is composed of two parts 163a, 163b wherein part 163a is attached to the main part 161a and part 163b is attached to the removable part 161b of the device body 161. The parts 163a, 163b of the tip 163 can be attached to the main part 161a and the removable part 161b, respectively, by screws inserted in respective borings 164a, 164b provided in the main part 161a and the removable part 161b.

The tip 163 may have a smaller diameter than the rest of the device body 161 which may have predominantly a cylindrical shape. The electrically insulating portion 166 extends throughout the longitudinal extension of the contact device 166 and provides an outlet 169 for the electrically insulated wire electrode (not shown) at an outlet 162 of the tip 163 of the contact device 160.

As can be seen in the cut open views presented in FIGS. 5a and 5e, the device body 161 has an interior section 167 with the electrically insulating portion 166 arranged in a central position, providing an electrically insulating portion for an electrically insulated wire electrode (not shown). The electrically insulating portion 166 is preferably an insulating tube such as a ceramics tube. On both sides of the central electrically insulating portion 166 a duct 168a, 168b is provided for wire electrodes (not shown) which are intended to be consumed by arcs during welding. The ducts 168a, 168b comprise corresponding groove portions in the tip parts 163a, 163b. The groove portions form an enclosure for the wire electrodes when the removable part 161b is attached to the main part 161a of the device body 161.

At the outside of the device body 161 a bolt 165 is arranged which holds the parts 161a, 161b of the device body together by way of spring elements such as e.g. disk springs, providing a contact pressure of the parts 161a, 161b virtually independent of the actual diameter of the wire electrodes.

An electrical contact can be attached to the contact device 160 in contact portion 164c arranged in the main part 161a of the device body 161. A wire connected to a power source can be connected to the contact portion 164c for transferring electric voltage and current to the contact device 160 so that arcs can develop at the non-insulated electrodes which are in close electric contact to the device body 161.

In the electrically insulating portion 166 the wire electrode can pass through the contact device 160 without contacting the other electrodes (not shown).

Figure 6:
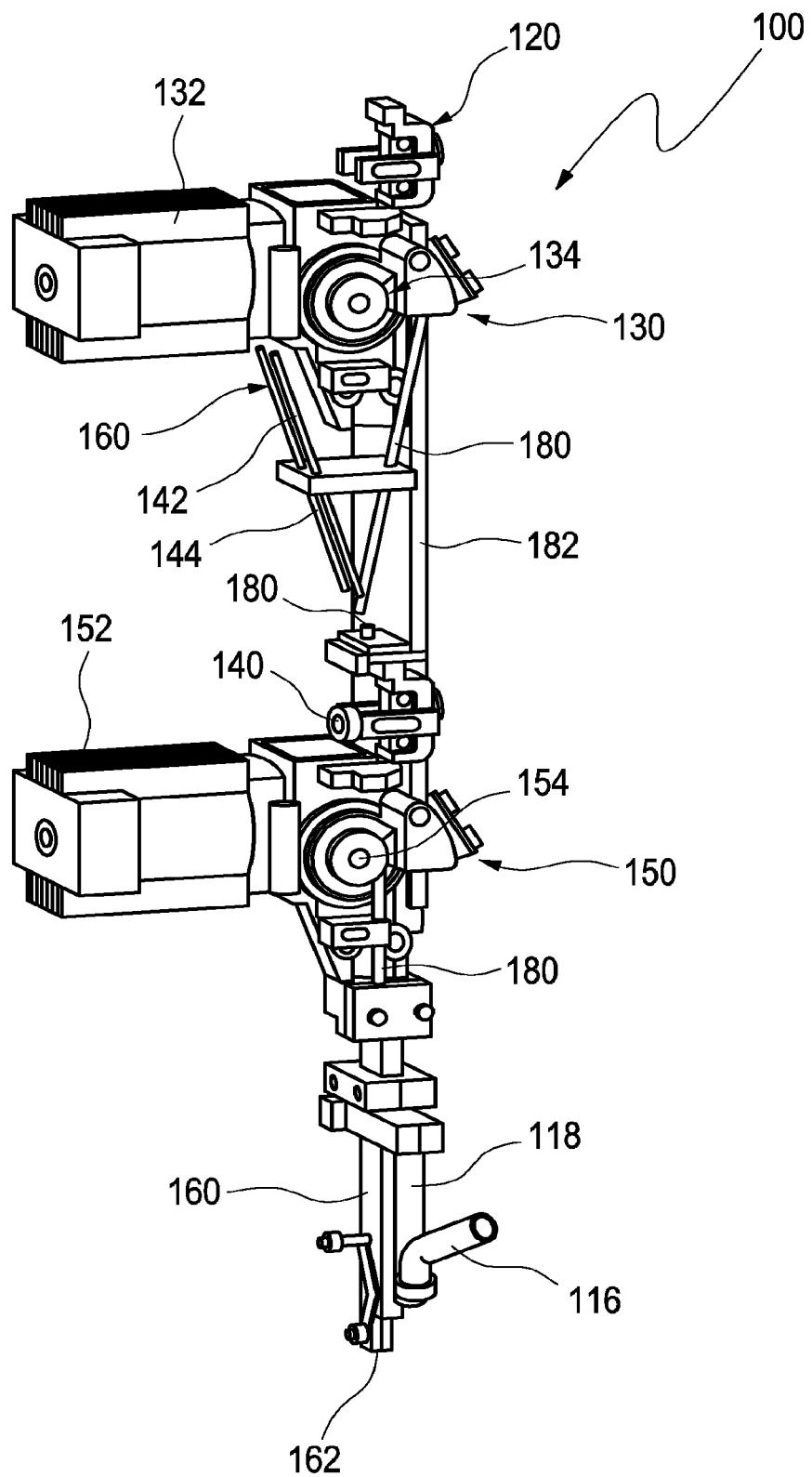
FIG. 6: a side view of an example embodiment of an arc-welding welding head

FIG. 6 is a side view of an example embodiment of an arc-welding welding head 100 of virtually the same layout as shown in FIGS. 2 to 4. In order to avoid unnecessary repetitions it is referred to these drawings for a detailed description of like elements. Above the wire straightening unit 140 two guide tubes 142, 144 are provided for twin electrodes. The guide tubes 142, 144 are arranged crosswise to the longitudinal extension of the welding head 100. Between the wire feeder unit 130 for the electrically insulated electrode (not shown) and the wire straightening unit 140 of the non-insulated electrodes (not shown) a guide tube 182 for the electrically insulated electrode (not shown) is arranged. The driving units 132, 152 can be equipped with pulse sensors for speed control of the electrodes. Close to the contact device 160 a nozzle 116 for a flux hopper 114 (FIGS. 2-4) is arranged, the nozzle 116 is fixed to a rod 116 arranged parallel to the longitudinal axis of the contact device 160.

Figure 7:
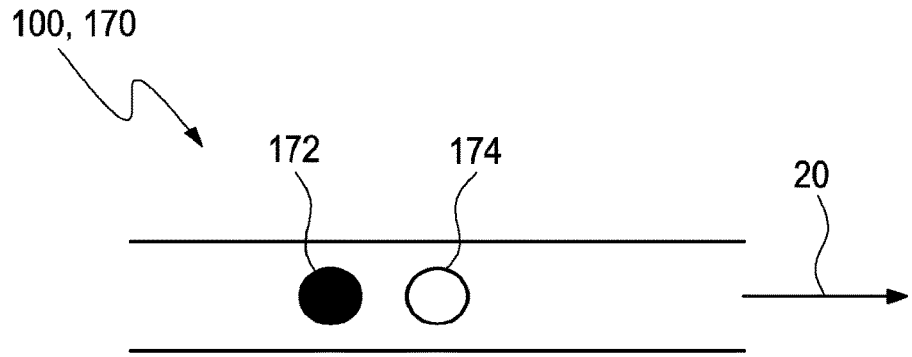
FIG. 7a-7c: an arrangement of an electrically insulated electrode and a hot electrode in a first electrode assembly comprising two electrodes (FIG. 7a), a second electrode assembly comprising three electrodes with the electrically insulated electrode being the central electrode (FIG. 7b), and a third electrode assembly comprising three electrodes with the electrically insulated electrode being at the outside of the electrode assembly (FIG. 7c)
Figure 7:
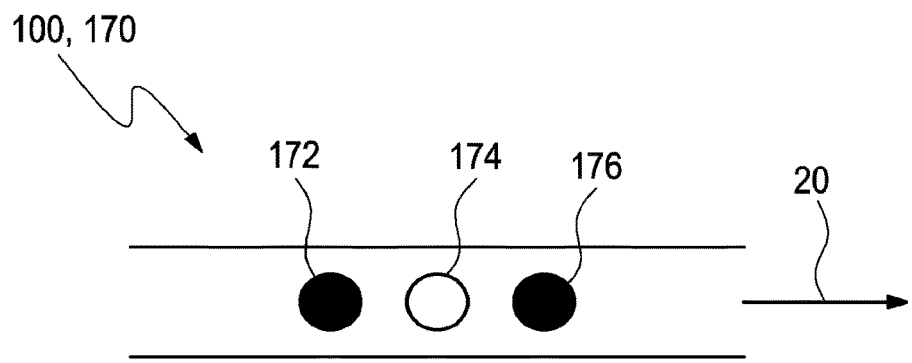
Figure 7:
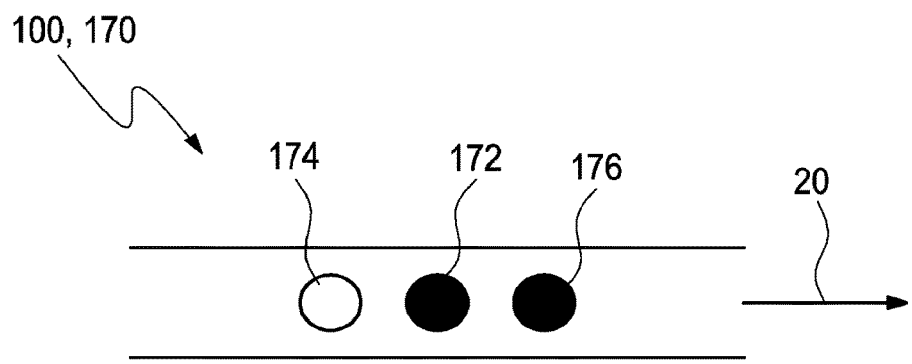

FIGS. 7a to 7c display arrangements of electrodes in electrode assemblies 170 with respect to a welding direction 20.

FIG. 7a shows a first variant of an electrode assembly 170 with an electrically insulated "cold" electrode 174 and a non-insulated "hot" electrode. A second variant of an electrode assembly 170 is shown in FIG. 7b comprising three electrodes 172, 174, 176 with the electrically insulated electrode 174 being the central electrode. A third variant of an electrode assembly 170 comprising three electrodes 172, 174, 176 with the electrically insulated electrode 174 being at the outside of the electrode assembly is displayed in FIG. 7c.

Figure 8:
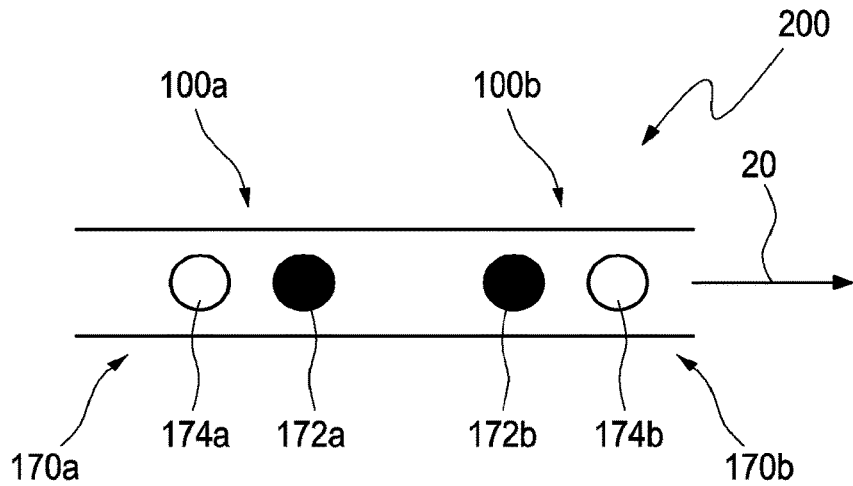
FIG. 8a-8c: an arrangement of two arc-welding welding heads each comprising an electrically insulated electrode and a hot electrode in a first electrode assembly comprising two electrodes in each welding head (FIG. 8a), a second electrode assembly comprising three electrodes in each welding head, with the electrically insulated electrode being the central electrode (FIG. 8b), and a third electrode assembly comprising three electrodes in each welding head, with the electrically insulated electrode being at the outside of the electrode assembly (FIG. 8c).
Figure 8:
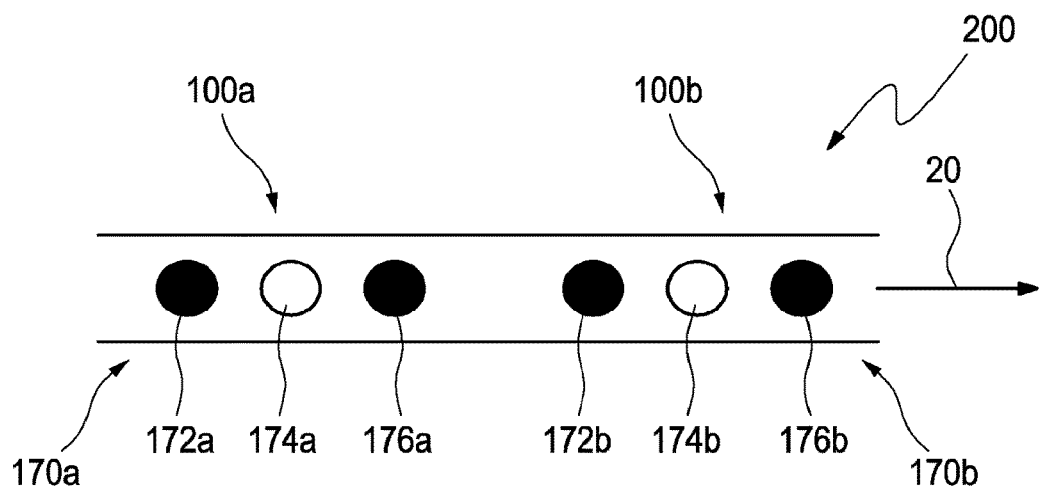
Figure 8:
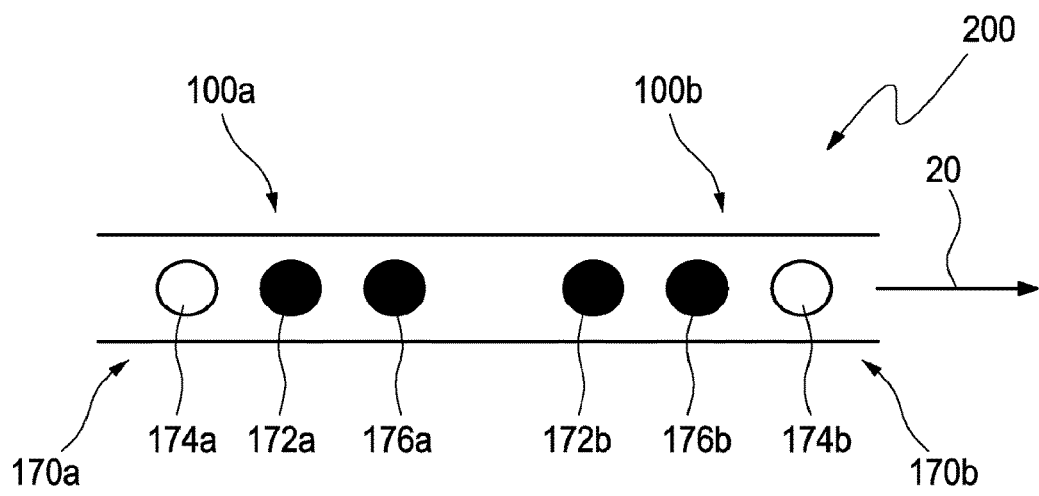

FIGS. 8a to 8c show arrangements of a welding head assembly 200 comprising two arc-welding welding heads 100a, 100b. Each welding head 100a, 100b comprises an electrode assembly 170a, 170b with an electrically insulated electrode 174a, 174b and one or more hot electrodes 172a, 172b. In a first variant of a welding head assembly 200 shown in FIG. 8a each welding head 100a, 100b comprises two electrodes 172a, 174a, 172b, 174b in each welding head 100a, 100b. The electrically insulated electrodes 174a, 174b are the outermost electrodes in the welding head assembly 200.

A second variant is shown in FIG. 8b, where each welding head 100a, 100b comprises an electrode assembly 170a, 170b with three electrodes 172a, 174a, 176a, 172b, 174b, 176b, wherein the electrically insulated electrode 174a, 174b is arranged in the middle between the two non-insulated electrodes 172a, 176a, 172b, 176b as central electrodes of each welding head 100a, 100b.

FIG. 8c shows a third variant with three electrodes 172a, 174a, 176a, 172b, 174b, 176b in each welding head 100a, 100b, with the electrically insulated electrode 174a, 174b being at the outside of the welding head assembly 200.

The invention claimed is:

1. An electric arc-welding welding head comprising:
   at least one fusible, continuously-fed hot wire electrode configured to be consumed in an arc during a welding operation;
   a fusible, continuously-fed cold wire electrode that is configured to be consumed without an arc by being in continuous short-circuit contact with a weld pool during the welding operation; and
   a contact device including a conductive body through which electrical power is delivered to the at least one hot wire electrode, the contact device being entirely included in or on the electric arc-welding head and including an electrically insulated duct that extends through the conductive body and at least one additional duct that is defined by the conductive body, wherein the at least one hot wire electrode extends through the at least one additional duct while the at least one additional duct delivers electrical power to the at least one hot wire electrode, and the cold wire electrode extends through the electrically insulated duct so that the cold wire electrode is electrically insulated from the at least one hot wire electrode.

2. The welding head of claim 1, wherein the cold wire electrode is melted by one or more of:
   a weld pool generated by melting the at least one hot wire electrode; and
   heat generated when melting the at least one hot wire electrode.

3. The welding head of claim 2, wherein the weld pool melts the cold wire electrode via resistance heating.

4. The welding head of claim 1, further comprising:
   a motor driven wire straightening unit for straightening the at least one hot wire electrode, the motor driven wire straightening unit including an electrically insulating portion for the cold wire electrode that electrically insulates the cold wire electrode from the at least one hot wire electrode while the motor driven wire straightening unit straightens the at least one hot wire electrode.

5. The welding head of claim 4, wherein the motor driven wire straightening unit is a first motor driven wire straightening unit and the welding head further comprises:
   a second motor driven wire straightening unit for straightening the cold wire electrode.

6. The welding head of claim 1, further comprising:
   a motor driven wire feeder unit for feeding the at least one hot wire electrode towards the contact device, the motor driven wire feeder unit including an electrically insulating portion for the cold wire electrode that electrically insulates the cold wire electrode from the at least one hot wire electrode while the motor driven wire feeder unit feeds the at least one hot wire electrode towards the contact device.

7. The welding head of claim 6, wherein the motor driven wire feeder unit is a first motor driven wire feeder unit and the welding head further comprises:
a second motor driven wire feeder unit for feeding the cold wire electrode towards the contact device.

8. The welding head of claim 7, wherein the first motor driven wire feeder unit has a first speed control unit, the second motor driven wire feeder unit has a second speed control unit, and the first speed control unit and the second control unit separately control feed speeds of the at least one hot wire electrode and the cold wire electrode, respectively.

9. The welding head of claim 7, wherein the insulated portion of the first motor driven wire feeder unit receives the cold wire electrode from the second motor driven wire feeder unit via at least an electrically insulated wire conduit extending substantially between the second motor driven wire feeder unit and the first motor driven wire feeder unit.

10. The welding head of claim 9, wherein the insulated portion of the first motor driven wire feeder unit receives the cold wire electrode directly from a motor driven wire straightening unit and the electrically insulated wire conduit extends between the second motor driven wire feeder unit and the motor driven wire straightening unit.

11. The welding head of claim 1, wherein the contact device includes a tip and the electrically insulated duct extends longitudinally through the contact device to provide an outlet for the cold wire electrode at an opening provided by the tip of the contact device.

12. The welding head of claim 11, wherein the outlet is disposed in a central position of within the opening of the tip.

13. The welding head of claim 11, wherein the outlet is disposed in an eccentric position within the opening of the tip.

14. The welding head of claim 1, wherein the electrically insulated duct comprises an electrically insulating tube.

15. The welding head of claim 1, wherein the at least one hot wire electrode is arranged in alignment with and ahead of the cold wire electrode with respect to a welding direction.

16. The welding head of claim 1, wherein the at least one hot wire electrode is arranged in alignment with and behind the cold wire electrode with respect to a welding direction.

17. The welding head of claim 1, wherein the at least one hot wire electrode includes two or more hot wire electrodes arranged ahead of and behind the cold wire electrode with respect to a welding direction.

18. A welding head comprising:
a fusible, continuously-fed cold wire electrode that is configured to be consumed without an arc by being in continuous short-circuit contact with a weld pool during a welding operation;
at least one fusible, continuously-fed hot wire electrode configured to be consumed in an arc during the welding operation;
a contact device including a conductive body through which electrical power is delivered to the at least one hot wire electrode, the contact device being entirely included in or on the welding head and including an electrically insulated duct that extends through the conductive body and at least one additional duct that is defined by the conductive body, wherein the at least one hot wire electrode extends through the at least one additional duct while the at least one additional duct delivers electrical power to the at least one hot wire electrode, and the cold wire electrode extends through the electrically insulated duct so that the cold wire electrode is electrically insulated from the at least one hot wire electrode;
a first motor driven wire feeder unit for feeding the at least one hot wire electrode towards the contact device; and
a second motor driven wire feeder unit for feeding the cold wire electrode towards the contact device.

19. The welding head of claim 18, further comprising:
a first motor driven wire straightening unit for straightening the at least one hot wire electrode; and
a second motor driven wire straightening unit for straightening the cold wire electrode.

20. The welding head of claim 19, wherein:
the second motor driven wire feeder unit receives the cold wire electrode from the second motor driven wire straightening unit and feeds the cold wire electrode towards the first motor driven wire straightening unit;
the first motor driven wire straightening unit includes a first electrically insulating portion for the cold wire electrode that electrically insulates the cold wire electrode from the at least one hot wire electrode while the first motor driven wire straightening unit straightens the at least one hot wire electrode, the first electrically insulating portion allowing the cold wire electrode to pass to the first motor driven wire feeder unit; and
the first motor driven wire feeder unit includes an electrically insulating portion for the cold wire electrode that electrically insulates the cold wire electrode from the at least one hot wire electrode while the first motor driven wire feeder unit feeds the at least one hot wire electrode towards the contact device.

\* \* \* \* \*